United States Patent [19]

Brown

[11] Patent Number: 4,674,933
[45] Date of Patent: Jun. 23, 1987

[54] HAY TOTE VEHICLE

[76] Inventor: Ronald D. Brown, Rte. 1, Box 89-A, Oxford, Fla. 32684

[21] Appl. No.: 794,396

[22] Filed: Nov. 4, 1985

[51] Int. Cl.[4] .......................................... A01D 87/12
[52] U.S. Cl. ........................... 414/24.6; 224/42.03 A; 293/117; 293/122; 414/24.5; 414/551; 414/685
[58] Field of Search ..................... 414/24.5, 24.6, 546, 414/551, 685; 293/44, 117, 122; 224/42.03 R, 42.03 A, 42.03 B, 42.04, 42.07, 42.08

[56] References Cited

U.S. PATENT DOCUMENTS

| | | | |
|---|---|---|---|
| 3,165,214 | 1/1965 | Young | 414/546 |
| 3,614,136 | 10/1971 | Dent | 293/117 X |
| 3,625,380 | 12/1971 | Anderson | 414/546 |
| 3,905,527 | 9/1975 | Chamberlain | 224/42.03 A |
| 4,120,405 | 10/1978 | Jones et al. | 414/24.5 |
| 4,182,590 | 1/1980 | Harkness | 414/24.5 |
| 4,364,701 | 12/1982 | Lynch et al. | 414/24.6 |
| 4,412,768 | 11/1983 | Bauer et al. | 414/24.5 |
| 4,538,948 | 9/1985 | Melton | 414/24.6 |

*Primary Examiner*—Leslie J. Paperner
*Attorney, Agent, or Firm*—William M. Hobby, III

[57] ABSTRACT

A load toting vehicle apparatus includes a vehicle such as a pick up truck having a special cylindrical bumper, rotably mounted to the rear thereof, with special bumper mounting brackets. The bumper mounting brackets have sleeves for the cylindrical bumper to rotate in, and a pair of spears are removably attachable to the cylindrical bumper for spearing a load of hay, or the like. The bumper has a rotating mechanism for rotating the bumper in the sleeves so as to lift the spears and any load mounted on the spears. The vehicle can be driven to spear a load of hay, or the like, then the load lifted and moved with the vehicle to a different location. The spears can be removed from their operating position and stored inside the hollow cylindrical bumper and locked in the bumper with a threaded clamp. The actuating mechanism includes a leverage bracket attached to the cylindrical bumper and connected with a hydraulic cylinder for rotating the cylindrical bumper. A tool box is formed in one end of the bumper and supports the stored spears on one end thereof.

12 Claims, 14 Drawing Figures

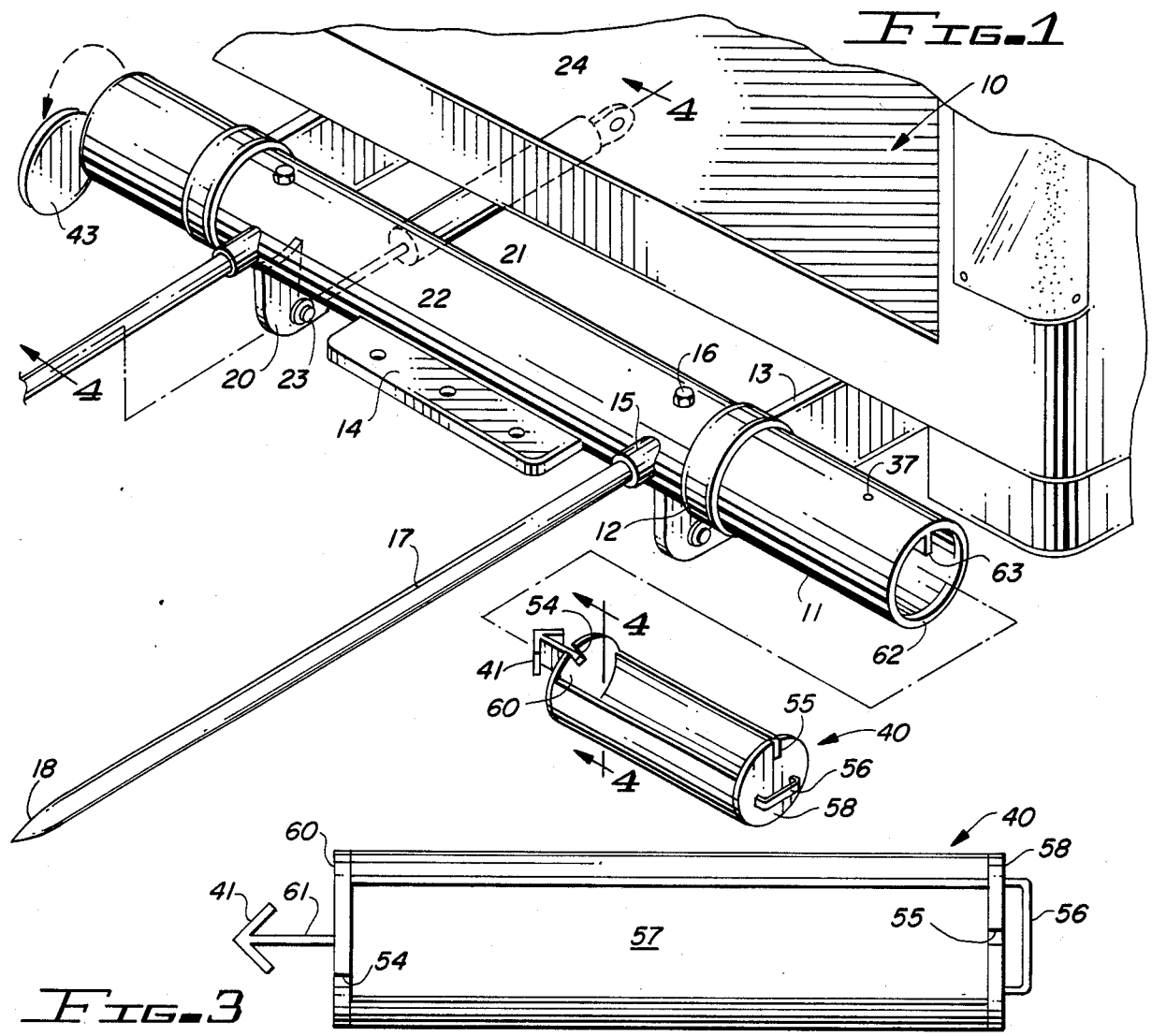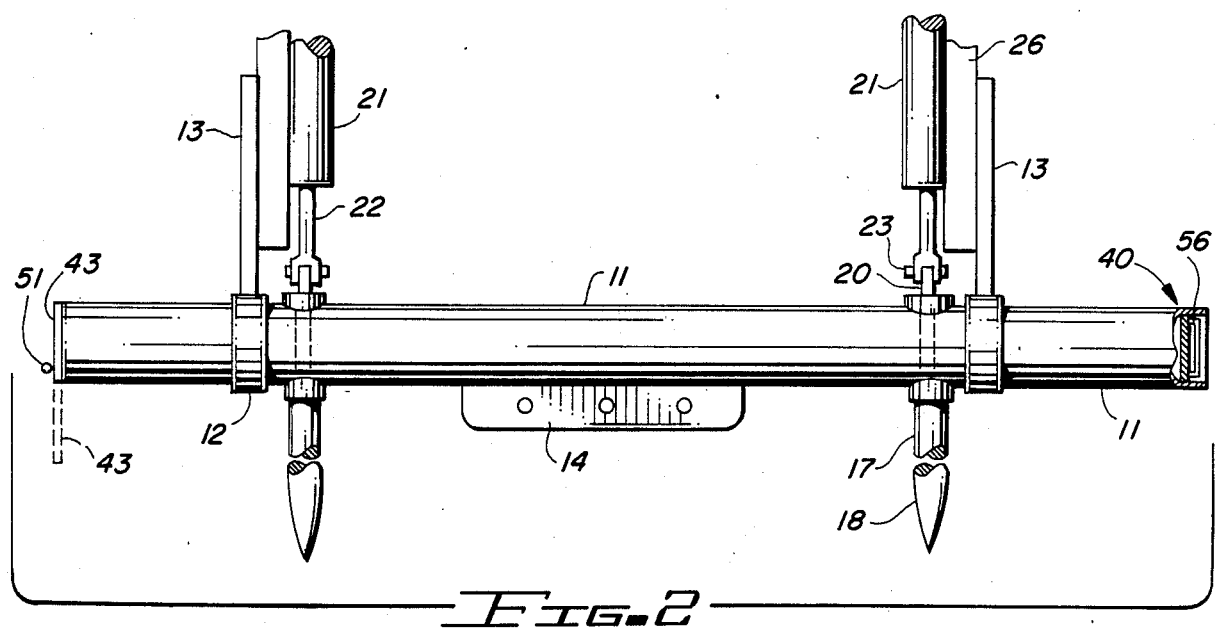

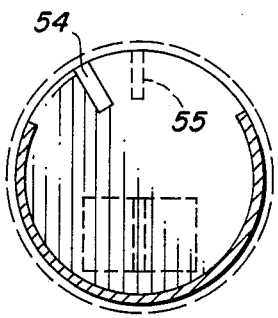
FIG.4
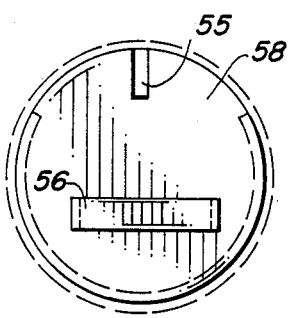
FIG.5
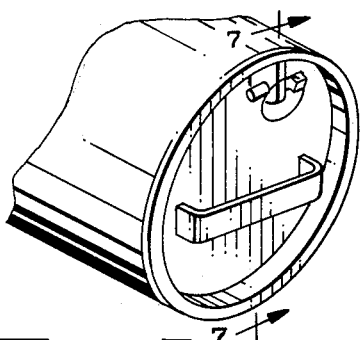
FIG.6
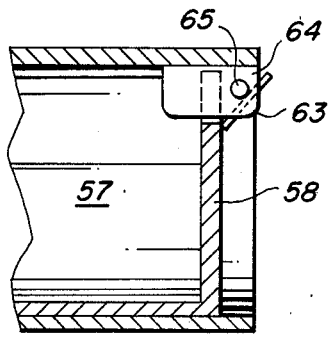
FIG.7
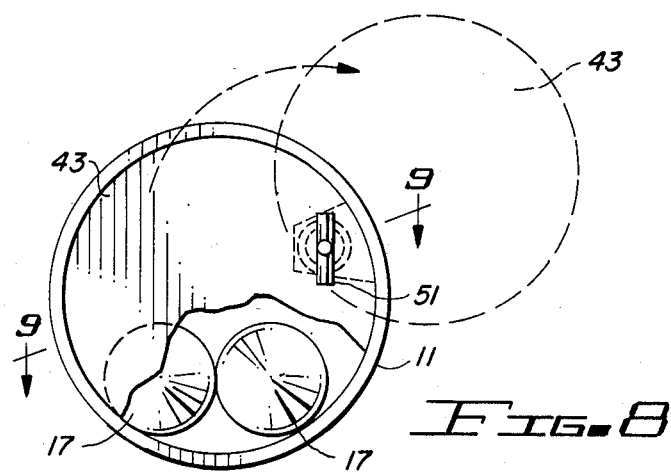
FIG.8
FIG.9
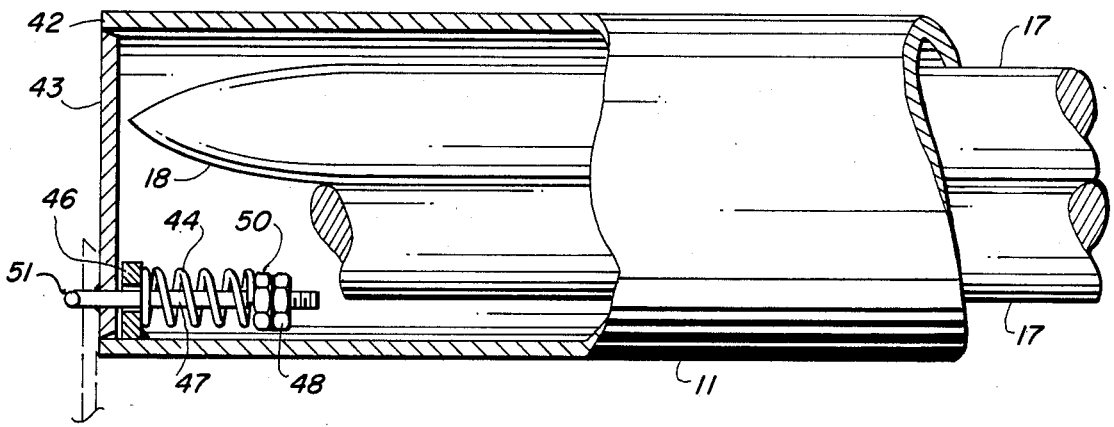
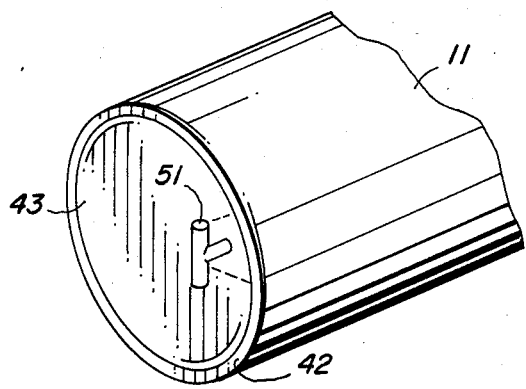
FIG.10A
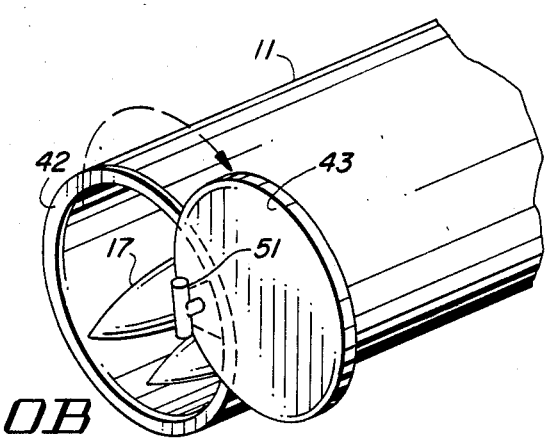
FIG.10B

HAY TOTE VEHICLE

BACKGROUND OF THE INVENTION

The present invention relates to a load toting vehicle and especially to a load toting vehicle adapted to be attached to a pickup truck, or the like, for moving bales of hay, or the like.

In the past, it has been common to store hay in hay stacks, as well as in bales and more recently in cylindrical bales. Cylindrical bales allow the hay to be picked up and moved for storage but also to be picked up and placed in a field for feeding livestock. The cylindrical bales of hay are rolled bales which can be unrolled for the livestock. Baling is accomplished through baling machines and the hay is commonly moved in pickup trucks or other farm vehicles. Prior U.S. Patents to Gildon, U.S. Pat. No.: 4,411,571 and to Lynch U.S. Pat. No.: 4,288,191 show means of handling cylindrical bales of hay. U.S. Pat. No.: 4,412,768 to Bauer is for a hay tote mechanism which operates in the manner similar to the present invention, in that it has a hydraulically actuated truck bumper mounted onto a pickup truck with two rigid bumper sections, and a rotatable center section having a pair of sockets for receiving bale piercing spears. Once the bale is loaded onto the spears, the hydraulic cylinder actuates the rotating part of the bumper to lift the bale.

The present invention, on the otherhand, replaces an entire bumper with a single rotating cylindrical bumper which can rotate in sleeves, bushings or bearings, responsive to a hydraulically actuated bracket attached thereto, and includes removable spears which can be stored within the cylindrical bumper itself and locked therein with a threaded clamp. The entire hay moving attachment is thus simplified over the Bauer and other Patents. It provides for convenient storage for the spears while the vehicle is being used for other purposes. In addition, a special attachment allows the hay to be speared from the side and rolled out onto a field for the feeding of livestock.

SUMMARY OF THE INVENTION

A load toting road vehicle apparatus allows for the spearing and lifting of a bale of hay for movement between locations. A vehicle such as a pickup truck, has a bumper mounting mechanism attached to the vehicle frame for mounting a bumper to the vehicle. The bumper mounting mechanism has a pair of sleeves on the end thereof and a hollow cylindrical bumper or a bumper having cylindrical portions is rotatably mounted to the bumper mounting mechanism as a cylindrical portion mounted in the sleeves for rotation therein. The sleeves may include bushings or bearings as desired. A pair of spears are removably attachable to the bumper and adapted to spear a load of hay, or the like, while a bumper rotating mechanism rotates the bumper in the bumper rotating mechanism rotates the bumper in the bumper mounting sleeves to lift the spears. The vehicle is driven to spear a bale of hay and the load is then lifted and moved with the vehicle. The bumper rotating mechanism includes hydraulic cylinders attached to the frame on one end and two leverage brackets which are fixably attached to the cylindrical bumper so that driving the bracket rotates the bumper. An attachment for the vehicle includes a bracket for attaching additional spears to the existing spears but extending perpendicular thereto for holding a cylindrical bale of hay along it's axis for unrolling the hay. A tool box is shaped to be placed in one end of the bumper and to support the spears end portions when the spears are stored in the bumper.

BRIEF DESCRIPTION OF THE DRAWINGS

Other objects, features and advantages of the present invention will be apparent from the written description and the drawings in which:

FIG. 1 is a partial perspective view of a road vehicle having a load lifting and moving mechanism attached thereto and the tool box removed therefrom;

FIG. 2 is a top plan view of the bumper, spears and bumper rotating and mounting mechanisms with portions cutaway;

FIG. 3 is a top elevation of the tool box of FIG. 1;

FIG. 4 is a sectional view taken on line 4—4 of FIG. 1 showing the tool box rotating mechanism;

FIG. 5 is an elevation view of the tool box;

FIG. 6 is a cutaway perspective view of the bumper and tool box mounted therein;

FIG. 7 is a sectional view taken on line 7—7 of FIG. 6;

FIG. 8 is a cutaway end elevation of one end of the bumper;

FIG. 9 is a sectional view taken on line 9—9 of FIG. 8;

FIG. 10A is an end perspective view of the spear storing end;

FIG. 10B is a partial perspective view of the bumper and of FIG. 10A having the door opened;

DESCRIPTION OF THE PREFERRED EMBODIMENTS

Figure 11:
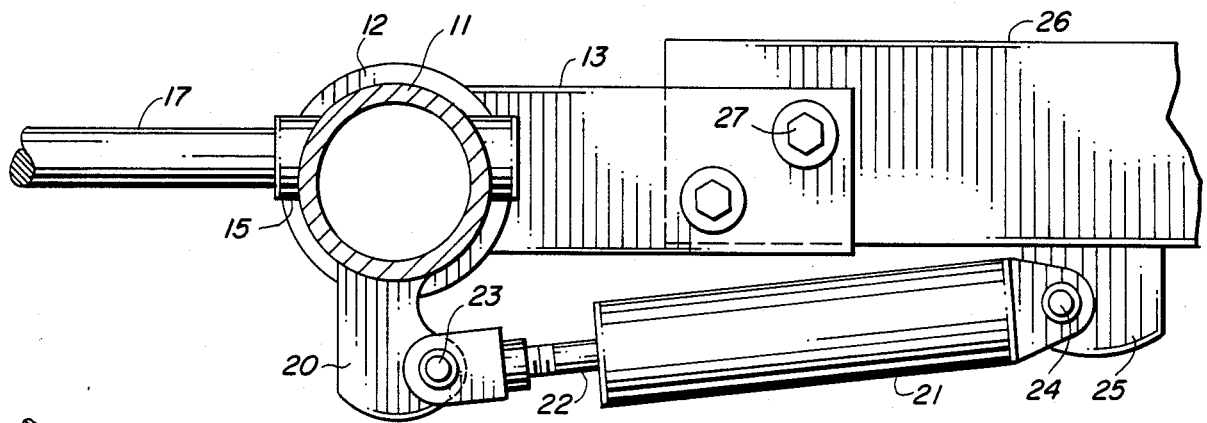
FIG. 11 is a sectional view of the bumper and bumper rotating system.
Figure 12:
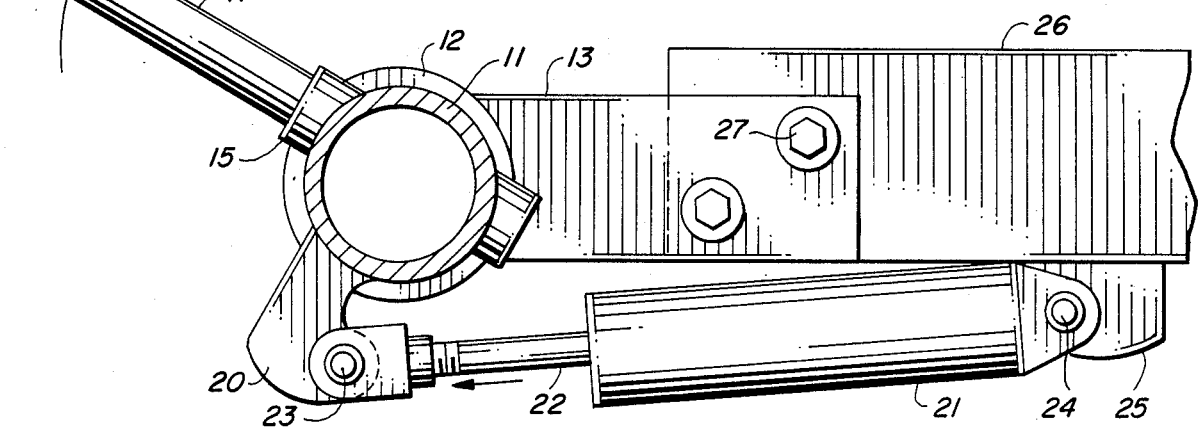
FIG. 12 is a sectional view of the bumper and bumper rotating mechanism of FIG. 11 having the hydraulic cylinder extended.

Referring to the drawings, and especially to FIGS. 1 through 13, a load toting vehicle, may be a pickup truck 10, which has had the bumper replaced with a hollow cylindrical bumper 11, rotably attached in sleeves 12, which form part of the bumper mounting system. The sleeves 12 are mounted to bumper support brackets 13 which in turn are attached to the frame of the vehicle 10. The bumper support mount 13 can be the existing bumper support brackets that originally came with the vehicle but which now have the cylinders 12 welded thereto. The bumper 11 has a three hole hitch 14 welded thereto, even though this is not necessary for the operation of the hay lifting mechanism. The bumper 11 has a pair of support cylinders 15 transversely mounted therein in a spaced position, and a pair of bolts 16 threadedly attached through the cylindrical bumper 11 to clamp down on the spears 17. The spears 17 use elongated steel rods having pointed ends 18 for spearing a bale of hay, or the like. The bumper 11 has a pair of leveraged lifting brackets 20 welded thereto. A pair of hydraulic cylinders 21, have hydraulic power rams 22 connected with pins 23 to bracket 20. Hydraulic cylinders 21 are pinned with pins 24 at the other end thereof to hydraulic cylinder support brackets 25 attached to the vehicle frame 26 (FIGS. 11 and 12). As shown in FIGS. 11 and 12, the support brackets 13 are attached to the frame 26 with a pair of bolts 27. In addition to the clamping bolt 16 for holding the spears 17 in place, other attaching means, such as pins can be attached through the steel spears 17.

In operation, the driver of the vehicle can back a pointed spear 17 into a cylindrical bale of hay, actuate the hydraulic cylinders from inside the cab to drive the brackets 20 to rotate the cylindrical bumper 11 in the sleeves 12 and thereby rotate the transversely mounted spears 17 to lift the hay. The operator of the vehicle can thereby drive the vehicle to any location desired, actuate the hydraulic cylinders 21 to lower the spears 17, to release the hay in place. The mechanism is simplified by using a single steel cylindrical pipe 11 for the bumper, as well as a simple rotating mechanism and support for the spears. The hollow cylindrical bumper 11 is also utilized for the storage of the spears 17 when not in use, so that they do not have to be stacked in the back of the pickup truck. The spears can have the bolts 16 loosened, the spears 17 removed therefrom, and slid into one end of the bumper against a bumper stop 41 formed on one end of the tool box 40. The spears are inserted in the end 42 opening in the pipe 11 which has a door or cover 43 fitted therein and held in place by a spring 44 attached to a spring support bracket 46 having an aperture therethrough. The spring wraps around a biased shaft 47 held with a nuts 48 and 50. The shaft 47 has an end portion 51 extending through an aperture in the bracket 46, so that by pulling the cover it can be lifted away from the pipe 11 and twisted as shown in FIGS. 10A and 10B, to thereby expose the spears 17 for removing or inserting the spears into the bumper 11. Pulling on the handle 51 allows the cover 43 to be lifted against the spring 44 for twisting it out of the way. The opposite end of the bumper 11 has the tool box 40 inserted therein as shown in FIGS. 4 through 7. The tool box has a slot 54 at one end placed at a slight angle to a slot 55 at the front end thereof. The front end also has handle 56 thereon and a tool storage area 57 between the ends 58 and 60. The tool box 40 is shaped in a cylindrical shape having an arrow or wedge shaped point 41 connected with a brace 61 on the end thereof for supporting spears inserted from the opposite end thereagainst and wedging them against the walls of the pipe 11. The tool box 40 is inserted into the end 62 of the pipe 11 by passing the slot 54 along the elongated bracket 63 until it passes the end of the bracket 63 and the tool box is then twisted to align the slot 55 with the bracket 63 and thereby move the slot 54 out of alignment with the other end of the bracket 63 to prevent the tool box from coming out. In addition, the locking member 63 can have an aperture 64 therethrough for passing a locking pin 65 to double lock the tool box 40 in the bumper and to assure that one end of the spears is supported against the fixed wedge surface 41.

Figure 13:
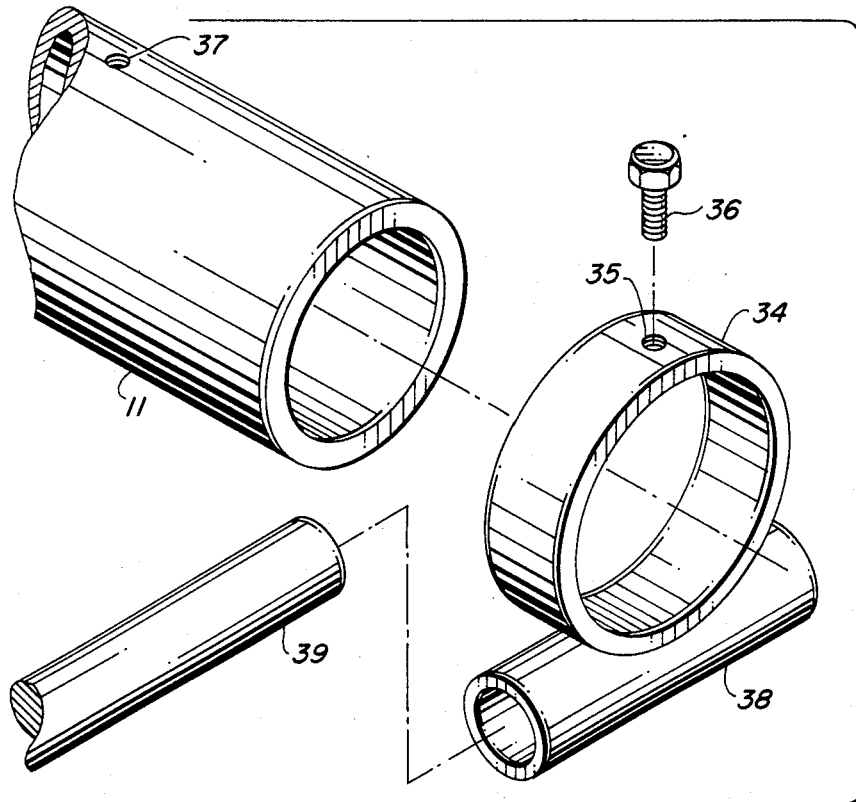
FIG. 13 is an exploded view of an attachment for the bumper.

The utility of the present invention is enhanced by the attachment shown in FIG. 13 which has brackets 34 having threaded openings 35 therein and a locking bolt 36, which can be slid onto the bumper 11 and the bolt 36 locked into the threaded opening 37. The sleeve bracket 34 has a transverse cylindrical sleeve 38 attached thereto such as by welding for attaching a spear 39. The spear 39 can have perpendicular spears attached thereto for supporting cylindrical hay along its center axis so that the hay can be unrolled as the vehicle is moved along. The attachment 34 is locked in place with a bolt 36 so that it rotates with the bumper 11 so that the hay can be lifted or dropped or unrolled as the vehicle is driven by the operator.

It should be clear at this point that a hay toting vehicle mechanism has been illustrated for attachment to a pickup truck or other road vehicle. The bumper is a simplified mechanism having rapid storage of the spears when the spears are not being used, while the cylindrical bumper acts as a normal bumper for the vehicle and includes a three hole bracket so that other attachments can be connected to the rear bumper. Accordingly, the present invention is not to be construed as limited to the forms shown, which are considered to be illustrative rather than restrictive.

I claim:

1. A load moving vehicle comprising:
   a vehicle;
   bumper mounting means attached to said vehicle for mounting a bumper to said vehicle, said bumper mounting means having a pair of sleeves thereon;
   a bumper having cylindrical portions rotatably mounted to said bumper mounting means with said bumper cylindrical portions mounted in said sleeves;
   a pair of spears removably attachable to said bumper and adapted to spear a load of hay, or the like;
   bumper rotating means for rotating said bumper in said bumper mounting means sleeves to thereby lift said spears; whereby said vehicle can be driven to spear a load of hay, or the like, the load lifted, and moved with said vehicle; and
   said bumper being a cylindrical hollow bumper having a storage space in one end position thereof for holding a pair of spears when the spears are detached from the bumper and having a cover on one end thereof, said cover for the one end of the bumper having a handle attached thereto and being spring biased to hold the cover onto the end of the bumper for holding the spears therein, and to allow the cover to be pulled against the spring and rotated to an open position for inserting or removing spears therefrom.

2. A load moving vehicle in accordance with claim 1 in which the bumper rotating means includes a pair of hydraulic cylinders; each attached at one end to the vehicle frame and each hydraulic cylinder being attached to a bracket attached to the bumper on the other end thereof whereby actuating the pair of hydraulic cylinders will drive the brackets to rotate the bumper in the bumper mounting means sleeves.

3. A load moving vehicle in accordance with claim 2 in which the bumper has a pair of apertures therein for inserting each spear into the bumper and has a threaded bolt threaded perpendicular to the spear holding aperture for bolting the spear in place.

4. A load moving vehicle in accordance with claim 3 in which the bumper has a pair of cylindrical spear holding sleeves extending perpendicular from the bumper to form the apertures for sliding the sleeves into the bumper.

5. A load moving vehicle in accordance with claim 4 in which the bumper has a three point hitch fixably attached thereto.

6. A load moving vehicle in accordance with claim 1 including a spear attaching means having a spear support sleeve, having a cylindrical spear holding member fixably attached tangentially to said spear support sleeve, said spear support sleeve being adapted to slide onto a cylindrical bumper and having a threaded opening therein for driving a bolt through said sleeve spear support and into a threaded opening in said cylindrical bumper for locking said spear support sleeve to said bumper.

7. A load moving vehicle comprising:
a vehicle;
bumper mounting means attached to said vehicle for mounting a bumper to said vehicle, said bumper mounting means having a pair of sleeves thereon;
a bumper having cylindrical portions rotatably mounted to said bumper mounting means with said bumper cylindrical portions mounted in said sleeves;
a pair of spears removably attachable to said bumper and adapted to spear a load of hay, or the like;
bumper rotating means for rotating said bumper in said bumper mounting means sleeves to thereby lift said spears; whereby said vehicle can be driven to spear a load of hay, or the like, the load lifted, and moved with said vehicle; and
a tool box slidably mounted into one end of the bumper and having a generally cylindrical shape having a pair of end member, one said end having a locking member fixably attached thereto.

8. A load moving vehicle in accordance with claim 7 in which said tool box spear locking member includes a wedging member for wedging a pair of spears in said bumper against the interior walls of the cylindrical bumper.

9. A load moving vehicle in accordance with claim 8 in which each said end member of said tool box has a slot therein, with a slot on one end being angled from the slot on the other end and said bumper having a locking bracket extending thereinto, whereby the slot in one end can be slid onto the locking bracket to a position past the locking bracket, and the tool box twisted to align the other end slot for sliding onto the locking bracket.

10. A load moving vehicle in accordance with claim 9 in which said locking bracket has an aperture therein for attaching a locking pin to lock the tool box in the bumper.

11. A load moving vehicle in accordance with claim 10 in which said tool box or other end has a handle attached thereto for grasping said tool box.

12. A load moving vehicle comprising:
a vehicle;
bumper mounting means attached to said vehicle for mounting a bumper to said vehicle, said bumper mounting means having a pair of sleeves thereon;
a bumper having cylindrical portions rotatably mounted to said bumper mounting means with said bumper cylindrical portions mounted in said sleeves;
a pair of spears removably attachable to said bumper and adapted to spear a load of hay, or the like;
bumper rotating means for rotating said bumper in said bumper mounting means sleeves to thereby lift said spears; whereby said vehicle can be driven to spear a load of hay, or the like, the load lifted, and moved with said vehicle; and
a spear attaching means having a spear support sleeve, and having a cylindrical spear holding member fixably attached tangentially to said spear support sleeve, said spear support sleeve being adapted to slide onto a cylindrical bumper and having a threaded opening therein for driving a bolt through said sleeve spear support and into a threaded opening in said cylindrical bumper for locking said spear support sleeve to said bumper.

* * * * *